(12) United States Patent
Freeman et al.

(10) Patent No.: US 11,215,075 B2
(45) Date of Patent: Jan. 4, 2022

(54) TURBINE SHROUD ASSEMBLY WITH FLANGE MOUNTED CERAMIC MATRIX COMPOSITE TURBINE SHROUD RING

(71) Applicants: Rolls-Royce North American Technologies Inc., Indianapolis, IN (US); Rolls-Royce Corporation, Indianapolis, IN (US)

(72) Inventors: Ted J. Freeman, Danville, IN (US); David J. Thomas, Brownsburg, IN (US); Jeffrey A. Walston, Indianapolis, IN (US); Aaron D. Sippel, Zionsville, IN (US)

(73) Assignees: Rolls-Royce North American Technologies Inc., Indianapolis, IN (US); Rolls-Royce Corporation, Indianapolis, IN (US)

( * ) Notice: Subject to any disclaimer, the term of this patent is extended or adjusted under 35 U.S.C. 154(b) by 79 days.

(21) Appl. No.: 16/688,547

(22) Filed: Nov. 19, 2019

(65) Prior Publication Data

US 2021/0148248 A1     May 20, 2021

(51) Int. Cl.
*F01D 25/14* (2006.01)
*F01D 25/24* (2006.01)
*F01D 11/24* (2006.01)

(52) U.S. Cl.
CPC .............. *F01D 25/14* (2013.01); *F01D 11/24* (2013.01); *F01D 25/243* (2013.01); *F05D 2220/32* (2013.01); *F05D 2230/60* (2013.01); *F05D 2240/11* (2013.01); *F05D 2300/6033* (2013.01)

(58) Field of Classification Search
CPC ...... F01D 11/24; F01D 11/005; F01D 25/246; F01D 25/243
See application file for complete search history.

(56) References Cited

U.S. PATENT DOCUMENTS

| | | | | |
|---|---|---|---|---|
| 4,280,792 A | * | 7/1981 | Hartel | F01D 25/14 415/117 |
| 4,553,901 A | * | 11/1985 | Laurello | F01D 11/24 415/116 |
| 5,080,557 A | | 1/1992 | Berger | |
| 5,593,276 A | * | 1/1997 | Proctor | F01D 11/18 415/138 |
| 5,980,201 A | * | 11/1999 | Benoist | F01D 25/14 415/115 |

(Continued)

FOREIGN PATENT DOCUMENTS

| | | | | |
|---|---|---|---|---|
| FR | 3057333 A1 | * | 4/2018 | ........... F01D 25/243 |
| GB | 2251895 A | * | 7/1992 | .............. F01D 11/18 |
| GB | 2397102 A | * | 7/2004 | ................ F01D 9/04 |

*Primary Examiner* — Topaz L. Elliott
(74) *Attorney, Agent, or Firm* — Barnes & Thornburg LLP

(57) ABSTRACT

A turbine assembly adapted for use with a gas turbine engine includes an outer case, a blade track segment, and a carrier. The outer case extends circumferentially at least partway around an axis of the engine. The blade track segment is configured to define a portion of a gas path of the turbine assembly. The carrier is coupled with the outer case and the blade track segment to support the blade track segment in position radially relative to the axis. The carrier is coupled with the outer case for movement with the outer case in response to thermal expansion and contraction of the outer case during use of the turbine assembly.

15 Claims, 8 Drawing Sheets

(56) References Cited

U.S. PATENT DOCUMENTS

| | | | | |
|---|---|---|---|---|
| 6,089,821 A * | 7/2000 | Maguire | | F01D 11/24 |
| | | | | 415/115 |
| 6,305,899 B1 * | 10/2001 | Saunders | | F01D 21/045 |
| | | | | 415/9 |
| 6,997,673 B2 * | 2/2006 | Morris | | F01D 9/04 |
| | | | | 415/1 |
| 7,094,029 B2 * | 8/2006 | Taylor | | F01D 25/246 |
| | | | | 415/213.1 |
| 8,932,009 B2 | 1/2015 | Moraines et al. | | |
| 8,944,756 B2 | 2/2015 | Lagueux | | |
| 9,752,592 B2 | 9/2017 | Sippel et al. | | |
| 10,221,715 B2 | 3/2019 | Varney et al. | | |
| 10,329,939 B2 | 6/2019 | Paulino | | |
| 10,364,707 B2 | 7/2019 | Dziech | | |
| 10,378,386 B2 | 8/2019 | Roussille et al. | | |
| 10,577,978 B2 * | 3/2020 | Freeman | | F01D 11/08 |
| 10,697,314 B2 * | 6/2020 | Thomas | | F01D 25/005 |
| 2008/0178465 A1 * | 7/2008 | Schiavo | | F01D 25/246 |
| | | | | 29/889.21 |
| 2008/0206047 A1 * | 8/2008 | Dakowski | | F01D 11/12 |
| | | | | 415/182.1 |
| 2009/0004002 A1 * | 1/2009 | Dong | | F01D 11/14 |
| | | | | 415/220 |
| 2016/0177786 A1 | 6/2016 | Sippel et al. | | |
| 2016/0186611 A1 * | 6/2016 | Vetters | | F01D 9/04 |
| | | | | 415/173.2 |
| 2016/0186762 A1 * | 6/2016 | Rautenstrauch | | F04D 29/023 |
| | | | | 415/68 |
| 2016/0258304 A1 * | 9/2016 | Sippel | | F01D 25/246 |
| 2016/0290157 A1 * | 10/2016 | Ning | | F01D 11/08 |
| 2018/0073398 A1 | 3/2018 | Quennehen et al. | | |
| 2018/0106160 A1 * | 4/2018 | Thomas | | F01D 25/005 |
| 2018/0149041 A1 * | 5/2018 | Freeman | | F01D 25/246 |
| 2018/0156069 A1 | 6/2018 | Quennehen et al. | | |
| 2019/0040758 A1 | 2/2019 | Quennehen et al. | | |
| 2019/0101027 A1 | 4/2019 | Lepretre et al. | | |
| 2019/0338663 A1 * | 11/2019 | Dierksmeier | | F01D 11/18 |
| 2021/0017867 A1 * | 1/2021 | Whittle | | F01D 5/282 |

* cited by examiner

TURBINE SHROUD ASSEMBLY WITH FLANGE MOUNTED CERAMIC MATRIX COMPOSITE TURBINE SHROUD RING

FIELD OF THE DISCLOSURE

The present disclosure relates generally to gas turbine engines, and more specifically to turbine shroud assemblies for use with gas turbine engines.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

Compressors and turbines typically include alternating stages of static vane assemblies and rotating wheel assemblies. The rotating wheel assemblies include disks carrying blades around their outer edges. When the rotating wheel assemblies turn, tips of the blades move along blade tracks included in static shrouds that are arranged around the rotating wheel assemblies. Such static shrouds may be coupled to an engine case that surrounds the compressor, the combustor, and the turbine.

Some shrouds positioned in the turbine may be exposed to high temperatures from products of the combustion reaction in the combustor. Such shrouds sometimes include components made from materials that have different coefficients of thermal expansion. Due to the differing coefficients of thermal expansion, the components of some turbine shrouds expand at different rates when exposed to combustion products. In some examples, coupling such components with traditional arrangements may not allow for the differing levels of expansion and contraction during operation of the gas turbine engine.

SUMMARY

The present disclosure may comprise one or more of the following features and combinations thereof.

A turbine assembly for use with a gas turbine engine may include an outer case, a blade track segment, and a carrier. The outer case may comprise metallic materials and may extend circumferentially at least partway around an axis. The blade track segment may comprise ceramic matrix composite materials and may be configured to define a portion of a gas path of the turbine assembly. The carrier may comprise metallic materials and may be coupled with the outer case and the blade track segment to support the blade track segment in position radially relative to the axis.

In some embodiments, the blade track segment may include a shroud wall and a mount post. The shroud wall may extend circumferentially partway about the axis. The mount post may extend radially outward away from the shroud wall.

In some embodiments, the carrier may include a support body and a mount flange. The mount flange may extend radially outward from the support body.

In some embodiments, the mount flange may be fastened with the outer case for radial movement with the outer case in response to thermal expansion and contraction of the outer case during use of the turbine assembly. The support body may be formed to define a radially inwardly opening channel in which the mount post of the blade track segment is located.

In some embodiments, the carrier may be formed to define a plurality of slots. The plurality of slots may extend axially through portions of the support body and radially outward only partway into the carrier. The plurality of slots may relieve stresses caused by the radial movement of the carrier in response to the thermal expansion and contraction of the outer case during use of the turbine assembly.

In some embodiments, the outer case may include a fore outer casing, an aft outer casing, and a fastener. The aft outer casing may be located axially aft of the fore outer casing.

In some embodiments, the forward outer casing may include a fore annular shell and a fore case flange. The fore case flange may extend radially outward from the annular shell.

In some embodiments, the aft outer casing may include an aft outer shell and an aft case flange. The aft case flange may extend radially outward from the annular shell.

In some embodiments, the mount flange may be arranged axially between the fore case flange and the aft case flange. The fastener may extend axially through the forward case flange, the mount flange of the carrier, and the aft case flange to couple the carrier to the outer case.

In some embodiments, the mount flange may include a forward facing surface, an aft facing surface, and a radially outwardly facing surface. The forward facing surface may be engaged by the fore case flange. The aft facing surface may be engaged by the aft case flange. The radially outwardly facing surface may extend between the forward facing surface and the aft facing surface and may be exposed to an air environment surrounding the outer case.

In some embodiments, the support body of the carrier may include a band, a fore attachment flange, and an aft attachment flange. The band may extend circumferentially about the axis. The fore attachment flange may extend radially inward from the band. The aft attachment flange may extend radially inward from the band.

In some embodiments, the aft attachment flange may be spaced apart axially from the fore attachment flange to define the radially inwardly opening channel. The radially inwardly opening channel may be formed between the fore attachment flange and the aft attachment flange.

In some embodiments, the carrier may include a fore carrier portion and an aft carrier portion. The fore carrier portion may define the fore attachment flange. The aft carrier portion may define the aft attachment flange.

In some embodiments, the aft carrier portion may be engaged with the fore carrier portion along an axial interface. The aft carrier portion may cooperate with the fore carrier portion to define the radially inwardly opening channel and the mount flange of the carrier.

In some embodiments, the radially inwardly opening channel may be dovetail shaped. The mount post may include a dovetail head. The dove tail head may be located in the radially inwardly opening channel.

In some embodiments, one of the fore case flange and the aft case flange may be formed to define a channel. The mount flange of the carrier may be located in the channel, and the fore case flange may engage the aft case flange of the aft outer case.

In some embodiments, the outer case may further include a case insert. The case insert may extend circumferentially at least partway about the axis. The case insert may extend around the mount flange of the carrier and engage the fore case flange and the aft case flange.

In some embodiments, the plurality of slots may include a plurality of fore slots and a plurality of aft slots. The plurality of fore slots may be formed in the fore attachment flange. The plurality of aft slots may be formed in the aft attachment flange. In some embodiments, the plurality of aft slots may be circumferentially offset with the plurality of fore slots formed in the fore attachment flange.

According to another aspect of the present disclosure, a turbine assembly for use with a gas turbine engine may include an outer case, a blade track segment, and a carrier. The outer case may be arranged circumferentially at least partway around an axis. The carrier may be coupled with the outer case and the blade track segment to support the blade track segment in position radially relative to the axis.

In some embodiments, the carrier may include a support body and a mount flange. The support body may extend between a forward axial end and an aft axial end. The mount flange may extend radially outward from the support body.

In some embodiments, the entire support body may be located radially inward of the outer case. The mount flange may be located axially between the forward axial end and the aft axial end of the support body.

In some embodiments, the mount flange may be fixed with the outer case for movement with the outer case. The mount flange may be fixed with the outer case to control a radial positon of the blade track segment relative to the axis in response to thermal expansion and contraction of the outer case.

In some embodiments, the carrier may be formed to define a plurality of slots. The plurality of slots may extend radially outwardly partway into the carrier. In some embodiments, the plurality of slots may extend radially outward into radially inward facing surfaces of the carrier.

In some embodiments, the support body may include a band, a fore attachment flange, and an aft attachment flange. The band may extend circumferentially about the axis. The fore attachment flange may extend radially inward from the band. The aft attachment flange may extend radially inward from the band.

In some embodiments, the plurality of slots may include a plurality of fore slots and a plurality of aft slots. The plurality of fore slots may be formed in the fore attachment flange. The plurality of aft slots may be formed in the aft attachment flange. In some embodiments, the plurality of aft slots may be circumferentially aligned with the plurality of fore slots formed in the fore attachment flange.

In some embodiments, the carrier may include a fore carrier member and an aft carrier member. The aft carrier member may mate with and cooperate with the fore carrier member to define the radially inwardly opening channel.

In some embodiments, the outer case may include a fore outer casing and an aft outer casing. The aft outer casing may be located axially aft of the fore outer casing.

In some embodiments, the forward outer casing may include a fore annular shell and a fore case flange. The fore case flange may extend radially outward from the annular shell.

In some embodiments, the aft outer casing may include an aft outer shell and an aft case flange. The aft case flange may extend radially outward from the annular shell. In some embodiments, the mount flange may be arranged axially between the fore case flange and the aft case flange.

In some embodiments, the mount flange may include a forward facing surface, an aft facing surface, and a radially outwardly facing surface. The forward facing surface may be engaged by the fore case flange. The aft facing surface may be engaged by the aft case flange. The radially outwardly facing surface may extend between the forward facing surface and the aft facing surface. In some embodiments, the radially outwardly facing surface may be exposed to air radially outward of the turbine assembly.

In some embodiments, the carrier may include a plurality of carrier segments. The plurality of carrier segments may each extend circumferentially partway about the axis. In some embodiments, the fore case flange may extend around the radially outwardly facing surface of the mount flange of the carrier and engage the aft case flange of the aft outer casing.

In some embodiments, the outer case may further include a case insert. The case insert may extend circumferentially about the axis. The case insert may extend around the mount flange of the carrier and engage the fore case flange and the aft case flange.

According to another aspect of the present disclosure, the method may include several steps. The method may include providing an outer case, a blade track segment, and a carrier. The outer case may extend circumferentially aft least partway about an axis. The blade track segment may be configured to define a portion of a gas path of the turbine assembly.

In some embodiments, the outer case may include a fore outer casing, an aft outer casing, and a fastener. The aft outer casing may be located axially aft of the fore outer casing.

In some embodiments, the blade track segment may include a shroud wall and a mount flange. The shroud wall may extend circumferentially partway about the axis. The mount post may extend radially outward away from the shroud wall.

In some embodiments, the carrier may include a support body and a mount flange. The support body may define a radially inwardly opening channel. The mount flange may extend radially outward from the support body, In some embodiments, the method may further include arranging the mount post of the blade track carrier in the radially outwardly opening channel and coupling the mount post of the blade track segment to the support body of the carrier for movement therewith. The method may further include arranging the mount flange of the carrier between the fore outer casing and the aft outer casing, and coupling the mount flange of the carrier to the fore outer casing and the aft outer casing of the outer case so that the support carrier is fixed with the outer case.

In some embodiments, the method may further include varying a flow of cooling air directed at the attachment interface of the fore outer casing, the aft outer casing, and the mount flange of the carrier. The flow of cooling air may be varied to thermally expand and contract the carrier so as to control a radial location of the blade track segment relative to the axis.

In some embodiments, the support body may include a band, a fore attachment flange, and an aft attachment flange. The band may extend circumferentially about the axis. The fore attachment flange may extend radially inward from the band. The aft attachment flange may extend radially inward from the band.

In some embodiments, the carrier may also be formed to define a plurality of slots. The plurality of slots may extend axially through the fore attachment flange and the aft attachment flange of the support body and radially outward into radially inward facing surfaces of the fore attachment flange and the aft attachment flange and partway into the carrier. The plurality of slots may relieve stresses caused by thermal expansion and contraction of the carrier during use of the turbine assembly.

These and other features of the present disclosure will become more apparent from the following description of the illustrative embodiments.

DETAILED DESCRIPTION OF THE DRAWINGS

Figure 1:
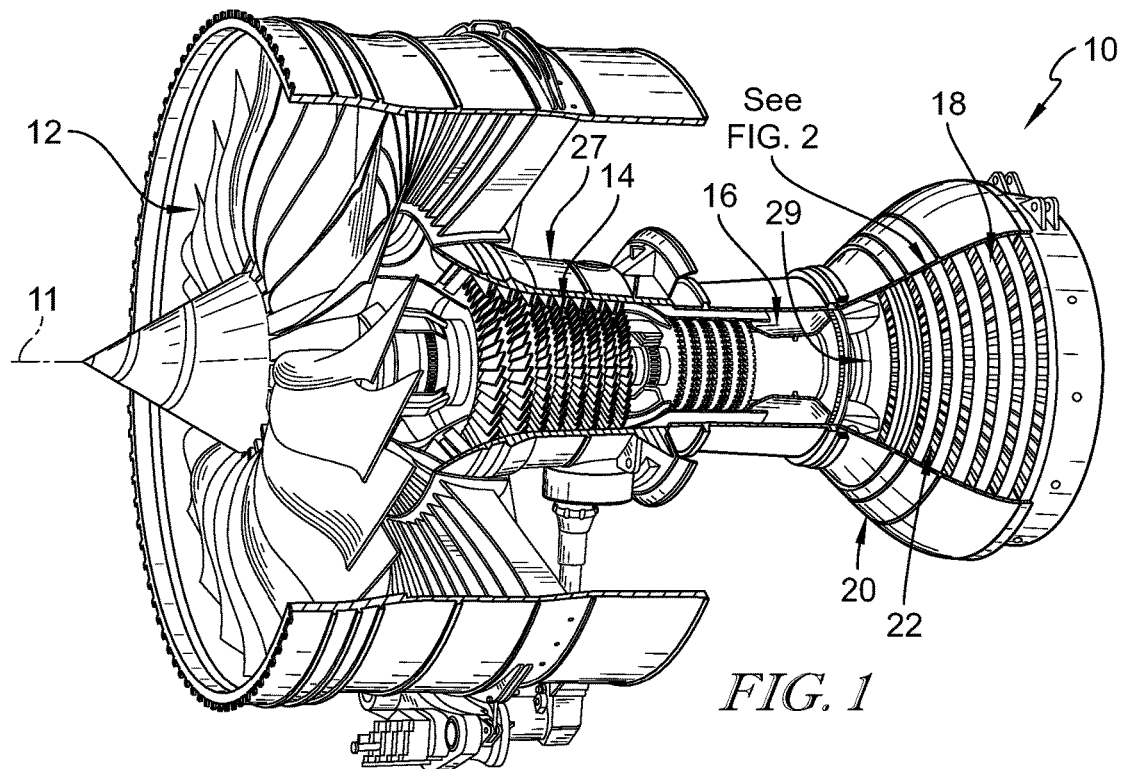
FIG. 1 is a cutaway view of a gas turbine engine that includes a fan, a compressor, a combustor, and a turbine assembly, the turbine assembly includes an outer case that extends circumferentially around an axis and a turbine wheel that is driven to rotate about an axis of the engine to generate power.

For the purposes of promoting an understanding of the principles of the disclosure, reference will now be made to a number of illustrative embodiments illustrated in the drawings and specific language will be used to describe the same.

Figure 2:
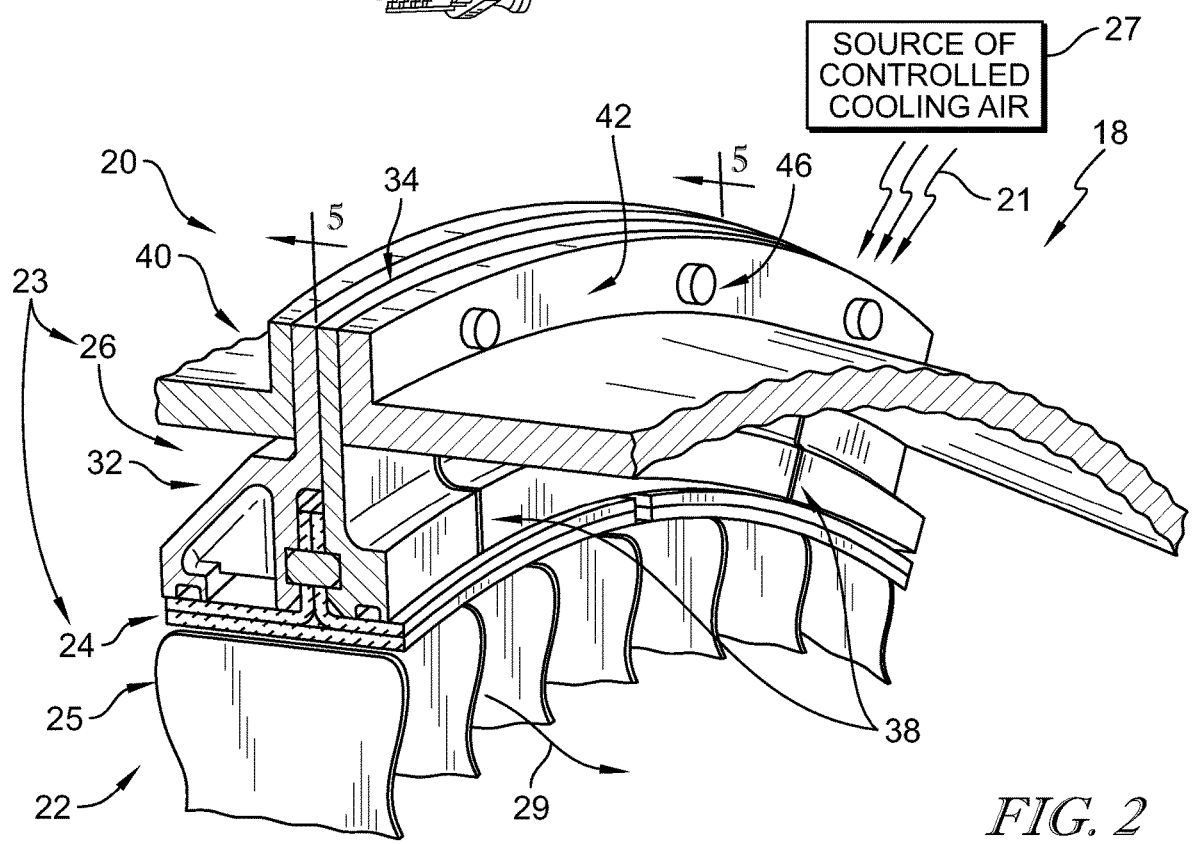
FIG. 2 is a portion of the turbine included in the gas turbine engine of FIG. 1 showing the turbine assembly further includes a blade track segment comprising ceramic matrix composite materials that extends circumferentially around turbine blades of the turbine wheel to form a gas path of the turbine assembly and a carrier comprising metallic materials that is coupled with the outer case and the blade track segment to support the blade track segment in position radially relative to the axis.

A turbine assembly 18 according to the present disclosure is adapted for use in a gas turbine engine 10 as suggested in FIGS. 1 and 2. The turbine assembly 18 includes an outer case 20, a bladed wheel assembly 22, and a turbine shroud assembly 23 as shown in FIGS. 1 and 2. The outer case 20 extends circumferentially at least partway around an axis 11. The bladed wheel assembly 22 includes a plurality of blades 25 coupled to a rotor disk for rotation therewith. The turbine shroud assembly 23 extends circumferentially at least partway about the axis 11 radially outward of the blades 25 to define a gas path 29 of the engine 10.

The turbine shroud assembly 23 includes blade track segments 24 and a carrier 26 as shown in FIG. 2. The blade track segments 24 are positioned radially outward of the blades 25 so as to define a portion of the gas path 29 of the turbine assembly 18 and block gases from passing over the blades 25 during use of the turbine assembly 18 in the gas turbine engine 10. The carrier 26 is coupled with the outer case 20 and the blade track segment 24 to support the blade track segment 24 in position radially relative to the axis 11.

In the illustrative embodiment, the blade track segment 24 comprises ceramic matrix composite materials, while the outer case 20 comprises metallic materials. The ceramic matrix composite materials of the blade track segment 24 is capable of withstanding high operating temperatures of the gas path 29 compared to the metallic materials of the outer case 20, which results in a large difference in coefficients of thermal expansion between the materials. As such, in some embodiments, turbine assemblies may include a carrier comprised of metallic materials that supports the blade track segment 24 and accommodates the difference in thermal growth between the outer case 20 and the blade track segment 24. However, the inclusion of carriers may increase the radial space claim outward of the blade track segment 24, therefore increasing the weight and cost of the engine 10.

Figure 4:
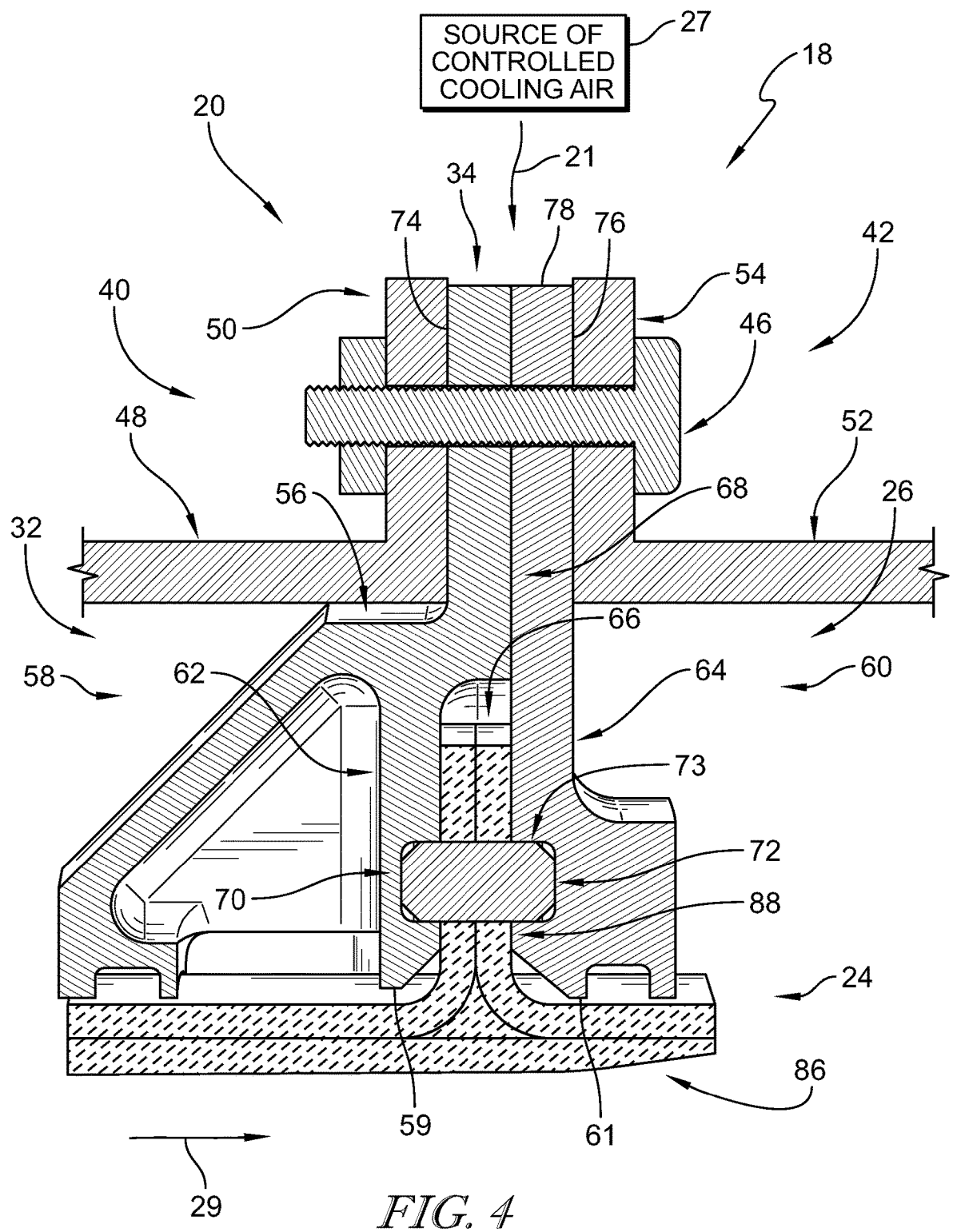
FIG. 4 is a section view of the turbine assembly of FIG. 3 showing the outer case includes a fore outer casing and an aft outer casing spaced axially apart from the fore outer casing and the carrier includes a support body and a mount flange that extends radially outwardly from the support between the forward outer casing and the aft outer casing to couple the carrier to the outer casing.

To minimize the radial space claim of the carrier 26, the carrier 26 includes a support body 32 and a mount flange 34 as shown in FIGS. 2 and 4. The support body 32 is formed to define a radially inwardly opening channel 66 in which a mount post 88 of the blade track segment 24 is located. The mount flange 34 of the carrier 26 extends radially outward from the support body 32 and through a portion of the outer case 20.

In the illustrative embodiment, the mount flange 34 of the carrier 26 extends through the outer case 20 and is fixed therewith. In other embodiments, the carriers may be coupled to the outer case 20 by hooks or rails that extend inward from the outer case 20. However, the hooks or rails occupy a large radial space claim. As such, the mount flange 34 of the carrier 26 extends through the outer case 20 to reduce the radial space claim of the carrier 26.

Additionally, hook or rail arrangements may also make it difficult to control a radial position of the blade track segment 24 relative to the axis 11. In the illustrative embodiment, the mount flange 34 is also coupled with the outer case 20 for radial movement therewith to control the radial position of the blade track segment 24 relative to the axis 11. By directing a flow of cooling air 21 at the attachment interface of the outer case 20 and the mount flange 34 of the carrier 26, the outer case 20 and carrier 26 thermally expand or contract, causing the blade track segment 24 to move with the carrier 26, thus controlling the radial position of the blade track segment 24 relative to the axis 11.

Figure 3:
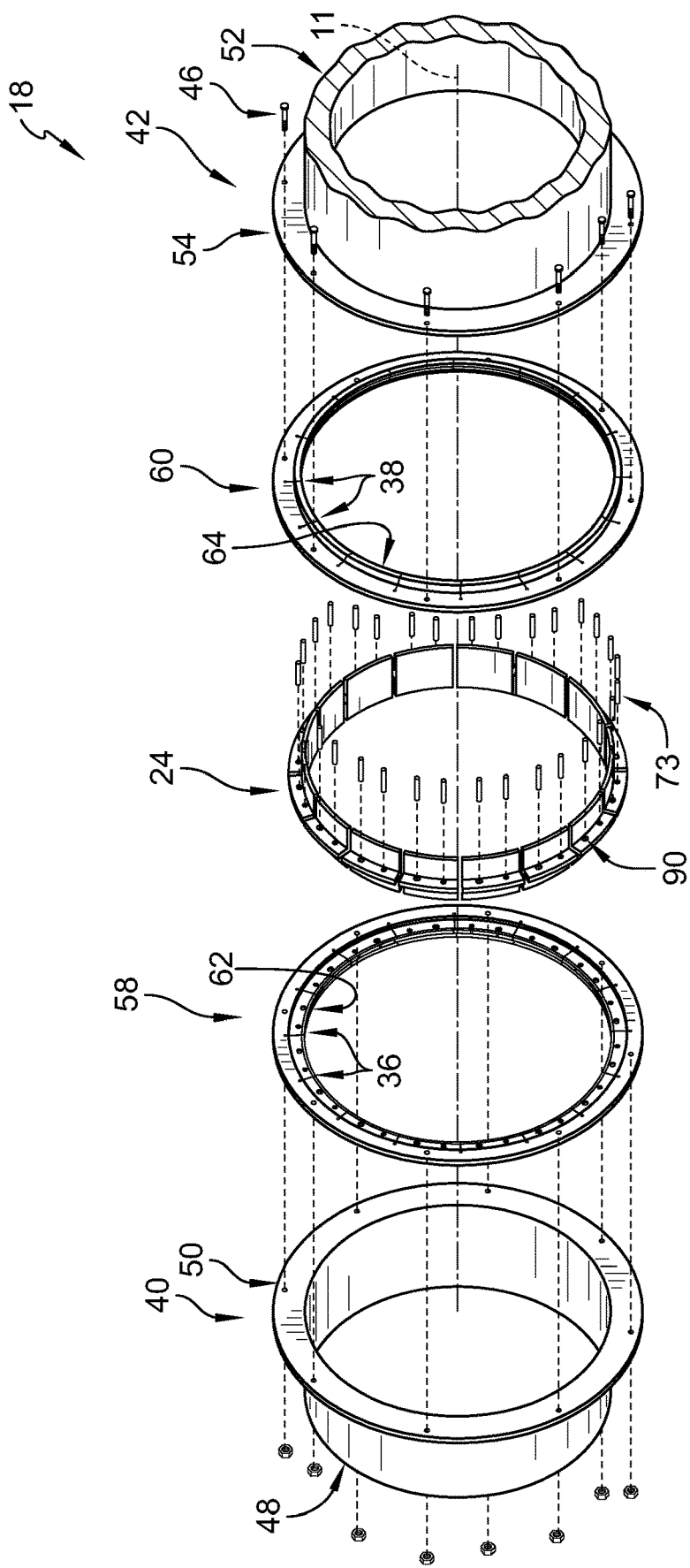
FIG. 3 is an exploded view of the turbine assembly of FIG. 2 showing that the outer case includes two casing segments each located at the left and right sides of the figure, the carrier includes a fore carrier portion and an aft carrier portion that each extend about the axis and cooperate together to couple the blade track segment to the outer case, and the blade track segments configured to be secured between the fore and aft carrier portions, and further showing both carrier portions are formed to define a plurality of slots to relieve stresses caused by thermal expansion and contraction of the carrier during use of the turbine assembly.
Figure 5:
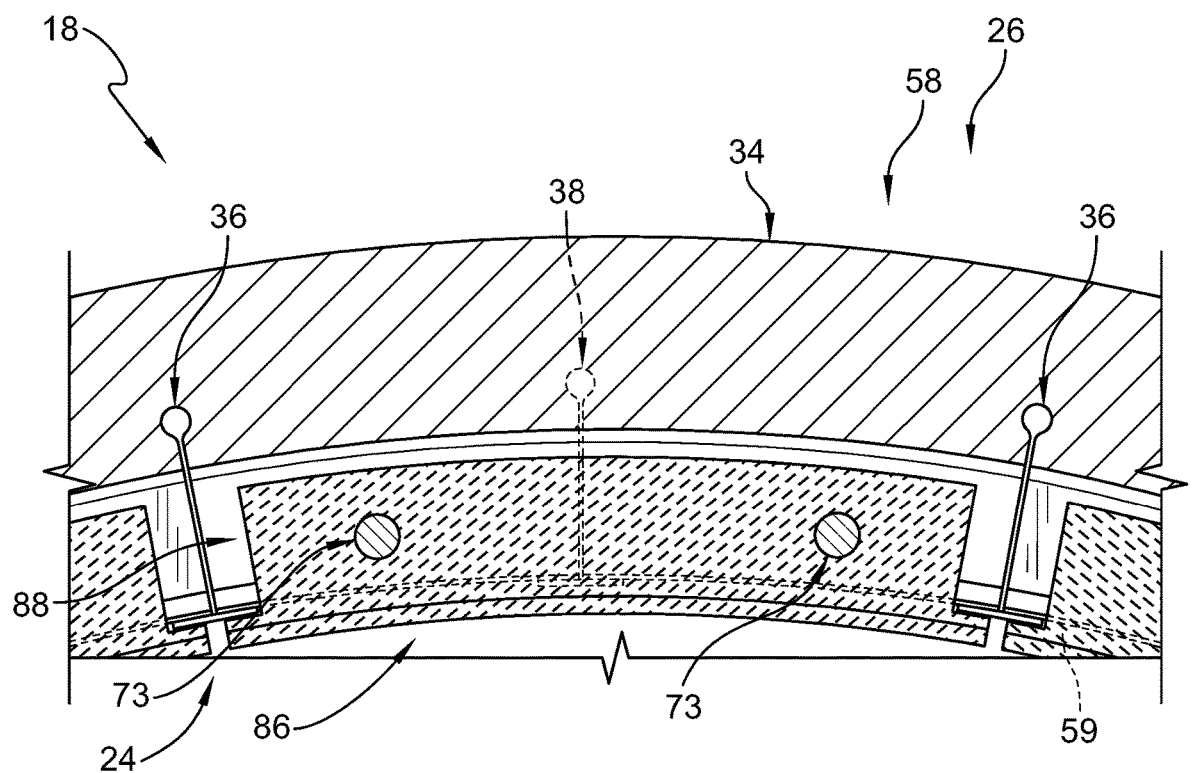
FIG. 5 is a section view of the turbine assembly of FIG. 2 taken along line 5-5 showing the plurality of slots formed in the fore carrier portion are circumferentially offset from the plurality of slots formed in the aft carrier portion.

The carrier 26 is also formed to define a plurality of slots 36, 38 as shown in FIGS. 2, 3, and 5. Each of the plurality of slots 36, 38 extends axially through portions of the support body 32 and radially outward only partway into the carrier 26. The arrangement of the slots 36, 38 relieves stresses caused by the radial movement of the carrier 26 in response to the thermal expansion and contraction of the outer case 20 and the carrier 26 during use of the turbine assembly.

Turning again to the gas turbine engine 10, the gas turbine engine 10 includes a fan 12, a compressor 14, a combustor 16, and a turbine assembly 18 as shown in FIG. 1. The fan 12 is driven by the turbine assembly 18 and provides thrust for propelling an air vehicle. The compressor 14 compresses and delivers air to the combustor 16. The combustor 16 mixes fuel with the compressed air received from the compressor 14 and ignites the fuel. The hot, high-pressure products of the combustion reaction in the combustor 16 are directed into the turbine assembly 18 to cause components of the turbine assembly 18 to rotate about the axis 11 and drive the compressor 14 and the fan 12. The outer case 20 of the turbine assembly 18 may extend circumferentially around other components of the gas turbine engine 10 in some embodiments.

The outer case 20 includes a fore outer casing 40, an aft outer casing 42, and fasteners 46 as shown in FIGS. 2-4. The aft outer casing 42 is located axially aft of the fore outer casing 40. The mount flange 34 of the carrier 26 is arranged axially between the fore outer casing 40 and the aft outer casing 42 so that the fasteners 46 extend axially through the fore outer casing 40, the mount flange 34, and the aft outer casing 42 to couple the carrier 26 to the outer case 20.

The fore outer casing 40 includes a fore annular shell 48 and a fore case flange 50 as shown in FIGS. 3 and 4. The fore annular shell 48 extends circumferentially about the axis 11. The fore case flange 50 extends radially outward from the fore annular shell 48 and engages the mount flange 34 of the carrier 26.

The aft outer casing 42 includes an aft annular shell 52 and an aft case flange 54 as shown in FIGS. 3 and 4. The aft annular shell 52 extends circumferentially about the axis 11. The aft case flange 54 extends radially outward from the aft annular shell 52 and engages the mount flange 34 of the carrier 26.

In the illustrative embodiment, the mount flange 34 is arranged axially between the fore case flange 50 and the aft case flange 54 as shown in FIGS. 2 and 4. The fastener 46 extends axially through the fore case flange 50, the mount flange 34 of the carrier 26, and the aft case flange 54 to couple the carrier 26 to the outer case 20. The mount flange 34 is in thermal engagement with the fore case flange 50 and the aft case flange 54 so that the components heat and cool to expand and contract together. A portion of the mount flange 34 is exposed to gases so that the gases may directly change a temperature of the mount flange 34.

The support body 32 of the carrier 26 includes a band 56, a fore attachment flange 62, and an aft attachment flange 64 as shown in FIG. 4. The band 56 extends circumferentially about the axis 11. The fore attachment flange 62 extends radially inward from the band 56. The aft attachment flange 64 extends radially inward from the band 56. In the illustrative embodiment, the aft attachment flange 64 is spaced apart axially from the fore attachment flange 62 to define the radially inwardly opening channel 66 between the fore attachment flange 62 and the aft attachment flange 64.

In the illustrative embodiment, the carrier 26 is divided so that the carrier 26 includes a fore carrier portion 58 defining the fore attachment flange 62 and an aft carrier portion 60 defining the aft attachment flange 64 as shown in FIGS. 3 and 4. The aft carrier portion 60 is engaged with the fore carrier portion 58 along an axial interface 68. The aft carrier portion 60 cooperates with the fore carrier portion 58 to define the radially inwardly opening channel 66 and the mount flange 34 of the carrier 26. In other embodiments, the carrier 26 is a single, one-piece component.

In the illustrative embodiment, each of the fore carrier portion 58 and the aft carrier portion 60 extend circumferentially about the axis 11 to define a full hoop as shown in FIG. 3. The flow of cooling air 21 directed at the attachment interface between the fore case flange 50, the mount flange 34, and the aft case flange 54 causes the full hoop to thermally expand and contract together and control the radial position of the blade track segments 24.

In the illustrative embodiment, the turbine assembly 18 further includes a source of controlled cooling air 27 as shown in FIGS. 2 and 4. The source of controlled cooling air 27 is configured to supply the flow of cooling air 21 to the attachment interface between the fore case flange 50, the mount flange 34, and the aft case flange 54. The source of controlled cooling air 27 is bleed air from the compressor 14 in the illustrative embodiment. In some embodiments, the flow of cooling air 21 may be provided by metered holes or variable using a controller to vary the flow of cooling air 21 from the source of controlled cooling air 27.

The full hoop carrier portions 58, 60 may reduce the part count of the turbine assembly 18. Further, the full hoop carrier portions 58, 60 may minimize potential leakage paths. In segmented carrier arrangements, the gaps between the carrier segments may be a potential leakage path for hot gases in the gas path 29. The full hoop carrier portions 58, 60 eliminate the gaps, while the slots 36, 38 help relieve stresses associated with full hoop arrangements.

In the illustrative embodiment, the plurality of slots 36, 38 include a plurality of fore slots 36 and a plurality of aft slots 38 as shown in FIGS. 2-4. The fore slots 36 extend axially through the fore attachment flange 62 and radially into the fore attachment flange 62 from a radially inwardly facing surface 59 of the fore carrier portion 58. The aft slots 38 extend axially through the aft attachment flange 64 and radially into the aft attachment flange 64 from a radially inwardly facing surface 61 of the aft attachment flange 64.

In the illustrative embodiment, the aft slots 38 are circumferentially offset from the fore slots 36 as shown in FIG. 5. The offset arrangement of the slots 36, 38 may help reduce leakage paths for hot gases inside the gas path 29. The aft slots 38 are circumferentially offset halfway between the fore slots 36 in the illustrative embodiment. In other embodiments, the aft slots 38 may be circumferentially offset more than or less than halfway between the fore slots 36. In some embodiments, the slots 36, 38 are aligned circumferentially.

In the illustrative embodiment, each of the fore carrier portion 58 and the aft carrier portion 60 are also shaped to include a plurality of blind holes 70, 72 as shown in FIGS. 3 and 4. The blind holes 70, 72 extend axially into the respective carrier portion 58, 60 and are sized to receive a pin 73. Each pin 73 extends axially through the mount post 88 of the blade track segments 24 and is trapped between the fore carrier portion 58 and the aft carrier portion 60 in the blind holes 70, 72 to couple the blade track segment 24 to the carrier 26. In other embodiments, the holes 70, 72 may be through holes. The pins may be fasteners such as bolts or rivets in other embodiments.

The mount flange 34 of the carrier 26 includes a forward facing surface 74, an aft facing surface 76, and a radially outwardly facing surface 78 as shown in FIG. 4. The forward facing surface 74 is engaged by the fore case flange 50, while the aft facing surface 76 is engaged by the aft case flange 54. The radially outwardly facing surface 78 extends between the forward facing surface 74 and the aft facing surface 76. The radially outwardly facing surface 78 is exposed to an air environment surrounding the outer case 20 so that the flow of cooling air 21 may be directed at the attachment interface.

Turning again to the blade track segments 24, each blade track segment 24 includes a shroud wall 86 and the mount post 88 as shown in FIGS. 2-4. The shroud wall 86 extends circumferentially partway about the axis 11. The mount post 88 extends radially outward away from the shroud wall 86 into the channel 66.

In the illustrative embodiment, the turbine assembly 18 includes a plurality of blade track segments 24 that define the gas path 29 of the engine 10 as shown in FIG. 3. In other embodiments, the blade track segments 24 may be a full annular hoop and non-segmented to extend fully around the axis 11 and surround the bladed wheel assembly 22. In yet other embodiments, certain components of the turbine assembly 18 are segmented while other components are annular and non-segmented.

In the illustrative embodiment, the mount post 88 of the blade track segment 24 is shaped to define through holes 90 as shown in FIG. 3. The through holes 90 extend axially through the mount post 88 and are shaped to receive the pin 73 included in the carrier 26.

A method of assembling the turbine assembly 18 may include several steps. The method includes coupling the mount post 88 of the blade track segment 24 to the support body 32 of the carrier 26 for movement therewith. To couple the blade track segment 24 to the carrier 26, the method further includes arranging the pin 73 in the through hole 90 formed in the mount post 88 and aligning the fore carrier portion 58 with the aft carrier portion 60. The fore and aft carrier portions 58, 60 are aligned so that the blind holes 70 in the fore carrier portion 58 match up with the pins 73 assembled in the blade track segment 24 and the blind holes 72 in the aft carrier portion 60.

Once the fore carrier portion 58 is aligned with the pins 73 and the aft carrier portion 60, the method further includes translating the fore carrier portion 58 toward the aft carrier portion 60. The fore carrier portion 58 and the aft carrier portion 60 are then engaged at the axial interface 68 so that the mount post 88 of the blade track segment 24 is arranged in the radially inwardly opening channel 66 formed between the fore and aft carrier portions 58, 60.

After the blade track segments 24 are coupled to the carrier 26, the method continues by coupling the mount flange 34 of the carrier 26 to the outer case 20 so that the carrier 26 is fixed with the outer case 20. To couple the carrier 26 with the outer case 20, the method includes arranging the mount flange 34 of the carrier 26 between the fore outer casing 40 and the aft outer casing 42. In the illustrative embodiment, the mount flange 34 is arranged between the fore and aft outer casings 40, 42 so that the fastener holes align. Once the mount flange 34 is arranged between the fore outer casing 40 and the aft outer casing 42, the method further includes arranging the fastener 46 to extend through the fore case flange 50, the mount flange 34, and the aft case flange 54 to fix the mount flange 34 to the outer case 20.

Depending on the size of the radial gap between the shroud wall 86 of the blade track segment 24 relative to the blades 25, the method may further include varying a flow of cooling air 21 directed at the attachment interface of the fore outer casing 40, the aft outer casing 42, and the mount flange 34 of the carrier 26. The flow of cooling air 21 is configured to thermally expand or contract the carrier 26 so as to control the radial position of the blade track segment 24 relative to the axis 11.

Figure 6:
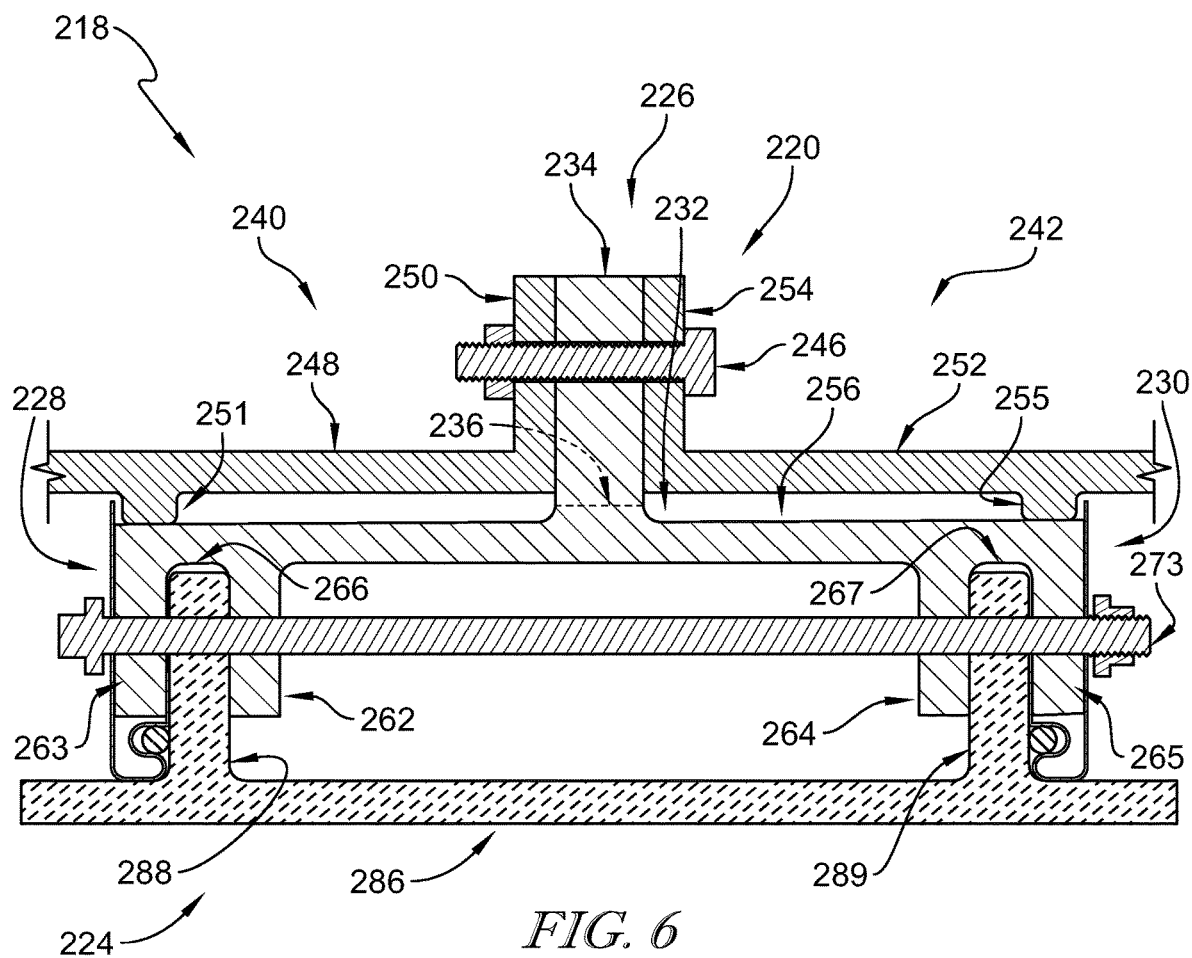
FIG. 6 is another embodiments of a turbine assembly for use in the gas turbine engine of FIG. 1 showing the turbine assembly includes an outer case, a blade track segment defining a portion of a gas path of the gas turbine engine, and a carrier that supports the blade track segment relative to the outer case, further showing the carrier is formed to include a band that extends circumferentially about the axis, a mount flange that extends radially outward from the band and couples with the outer case, and a plurality of attachment flanges that extend radially inward from the band to couple with mount posts of the blade track segment.

Another embodiment of a turbine assembly 218 in accordance with the present disclosure is shown in FIG. 6. The turbine assembly 218 is substantially similar to the turbine assembly 18 shown in FIGS. 1-5 and described herein. Accordingly, similar reference numbers in the 200 series indicate features that are common between the turbine assembly 18 and the turbine assembly 218. The description of the turbine assembly 18 is incorporated by reference to apply to the turbine assembly 218, except in instances when it conflicts with the specific description and the drawings of the turbine assembly 218.

The turbine assembly 218 includes an outer case 220, a blade track segment 224, a carrier 226, and seals 228, 230 as shown in FIG. 6. The outer case 220 extends circumferentially at least partway around the axis 11. The blade track segments 224 define the gas path of the turbine assembly 218 and block gases from passing over the blades 25 during use of the turbine assembly 218 in the gas turbine engine 10. The carrier 226 is coupled with the outer case 220 and the blade track segment 224 to support the blade track segment 224 in position radially relative to the axis 11. The seals 228, 230 are coupled to the carrier 226 on a forward side and an aft side of the carrier 226 to seal the carrier 226.

The outer case 20 includes a fore outer casing 240, an aft outer casing 242, and a fastener 246 as shown in FIG. 6. The aft outer casing 242 is spaced apart axially from the fore outer casing 240 to locate a portion of the carrier 226 therebetween. The fastener 246 is arranged to extend axially through the fore outer casing 240, the carrier 226, and the aft outer casing 242 to couple the carrier 226 to the outer case 220.

The fore outer casing 240 is shaped to include a fore annular shell 248, a fore case flange 250, and a fore pilot feature 251 as show in FIG. 6. The fore annular shell 248 extends circumferentially about the axis. The fore case flange 250 extends radially outward from the fore annular shell 248. The fore pilot feature 251 extends radially inward from the fore annular shell 248.

The aft outer casing 242 is shaped to include an aft annular shell 252, an aft case flange 254, and an aft pilot feature 255 as shown in FIG. 6. The aft annular shell 252 extends circumferentially about the axis 11. The aft case flange 254 extends radially outward from the aft annular shell 252. The aft pilot feature 255 extends radially inward from the aft annular shell 252.

In the illustrative embodiment, the fore pilot feature 251 is spaced axially forward from the fore case flange 250 and the aft pilot feature 255 is spaced axially aft of the aft case flange 254. Each of the fore and aft pilot features 251, 255 are configured to engage the carrier 226 to help better control the radial position of the blade track segment 224 due to the thermal expansion and contraction of the carrier 226.

The blade track segment 224 includes a shroud wall 286, a fore mount post 288, and an aft mount post 289 as shown in FIG. 6. The shroud wall 286 extends circumferentially partway about the axis 11. Each of the mount posts 288, 289 extends radially outward away from the shroud wall 286. The aft mount post 289 is axially spaced apart from the fore mount post 288.

The carrier 226 includes a support body 232 and a mount flange 234 as shown in FIG. 6. The support body 232 is formed to define radially inwardly opening channels 266, 267 in which the mount posts 288, 289 of the blade track segment 224 are located. The mount flange 234 extends radially outward from the support body 232. In the illustrative embodiment, the mount flange 234 is fastened with the outer case 220 for radial movement therewith in response to thermal expansion and contraction of the outer case 220 during use of the turbine assembly 218.

The carrier 226 is also formed to define a plurality of slots 236 as shown in FIG. 6. Each slot of the plurality of slots 236 extends axially through portions of the support body 232 and radially outward only partway into the carrier 226. The arrangement of the slots 236 relieves stresses caused by the radial movement of the carrier 226 in response to the thermal expansion and contraction of the outer case 220 during use of the turbine assembly. The mount flange 234 is un-slotted and may be full hoop around the axis 11.

The support body 232 of the carrier 226 includes a band 256, fore attachment flanges 262, 263 and an aft attachment flange 264, 265 as shown in FIG. 6. The band 256 extends circumferentially about the axis 11. The fore attachment flanges 262, 263 extend radially inward from the band 256. The aft attachment flanges 264, 265 extend radially inward from the band 256.

In the illustrative embodiment, the fore attachment flanges 262, 263 are axially spaced apart to define a fore channel 266, while the aft attachment flanges 264, 265 are axially spaced apart to define an aft channel 267 as shown in FIG. 6. The fore channel 266 is configured to receive the fore mount post 288 and the aft channel 267 is configured to receive the aft mount post 289.

In the illustrative embodiment, the carrier 226 includes pins 273 as shown in FIG. 6. The pins 273 extend through the fore attachment flanges 262, 263, the fore mount post 288, the aft attachment flanges 264, 265, and the aft mount post 289 to couple the blade track segment 224 to the carrier 226.

In the illustrative embodiment, the seals 228, 230 include a fore seal 228 and an aft seal 230 that are coupled to the fore attachment flange 263 and the aft attachment flange 265 as shown in FIG. 6. The seals 228, 230 are coupled to the attachment flanges 263, 265 of the carrier 226 to seal the slots 236.

A method of assembling the turbine assembly 218 may include several steps. The method includes coupling the mount posts 288, 289 of the blade track segment 224 to the support body 232 of the carrier 226 for movement therewith. To couple the blade track segment 224 to the carrier 226, the method further includes arranging the fore mount post 288 in the fore channel 266 of the carrier 226 and arranging the aft mount post 289 in the aft channel 267 of the carrier 226. Once the mount posts 288, 289 are in the channels 266, 267, the method continues by aligning the fore seal 228 with the fore attachment flange 263 and aligning the aft seal 230 with the aft attachment flange 265.

After each of the components are correctly arranged, the method includes arranging the pin 273 to extend axially through the fore seal 228, the fore attachment flanges 262, 263, the fore mount post 288, the aft attachment flanges 264, 265, the aft mount post 289, and the aft seal 230. The pin 273 then couples the components together to fix the blade track segment 224 with the carrier 226 and seal the assembled structure.

After the blade track segments 224 are coupled to the carrier 226, the method continues by coupling the mount flange 234 of the carrier 226 to the outer case 220 so that the carrier 226 is fixed with the outer case 220. Then, depending on the size of the radial gap between the blade track segment 224 relative to the blades 225, the method may further include varying a flow of cooling air 21 directed at the attachment interface of outer case 220 and the carrier 226. The flow of cooling air 21 is configured to thermally expand or contract the carrier 226 so as to control the radial position of the blade track segment 224 relative to the axis 11.

Figure 7A:
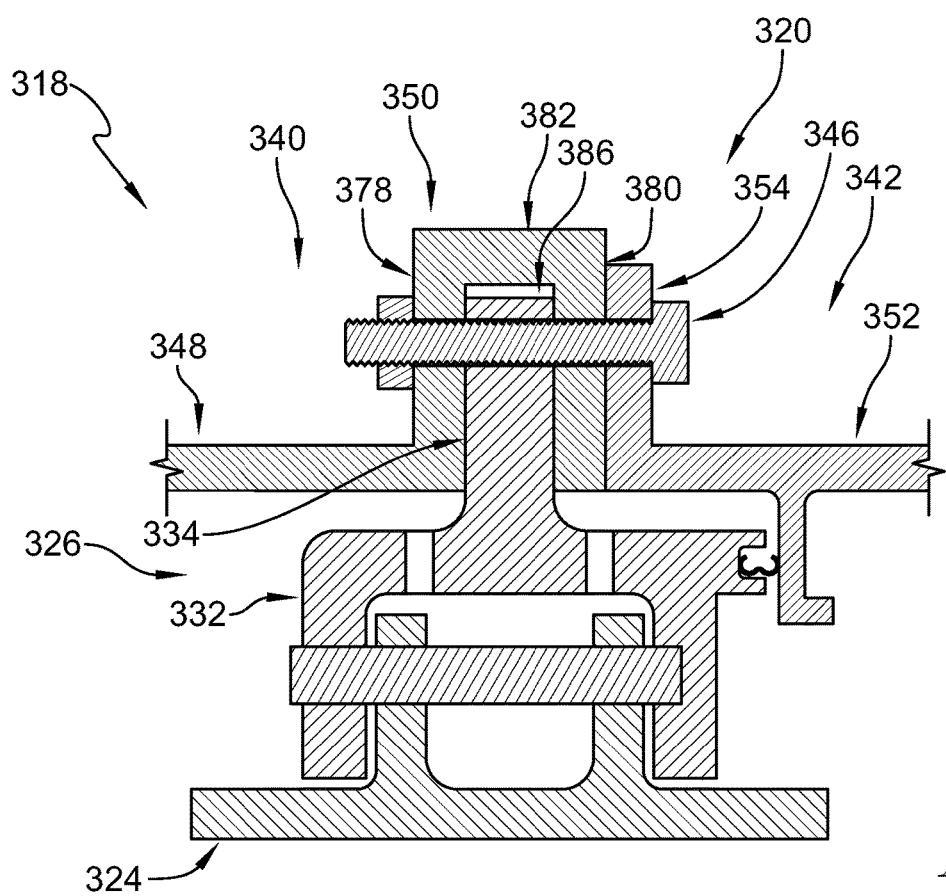
FIG. 7A is another embodiment of a turbine assembly for use in the gas turbine engine of FIG. 1 showing the turbine assembly includes an outer case having a fore outer casing and an aft outer casing, a blade track segment defining a portion of a gas path of the gas turbine engine, and a carrier coupled with the outer case and the blade track segment to support the blade track segment, and further showing the fore outer casing includes an annular shell and a fore case flange that extends radially outward from the annular shell and around a mount flange of the carrier to couple the carrier to the outer case.

Another embodiment of a turbine assembly 318 in accordance with the present disclosure is shown in FIG. 7A. The turbine assembly 318 is substantially similar to the turbine assembly 18 shown in FIGS. 1-5 and described herein. Accordingly, similar reference numbers in the 300 series indicate features that are common between the turbine assembly 18 and the turbine assembly 318. The description of the turbine assembly 18 is incorporated by reference to apply to the turbine assembly 318, except in instances when it conflicts with the specific description and the drawings of the turbine assembly 318.

Figure 7B:
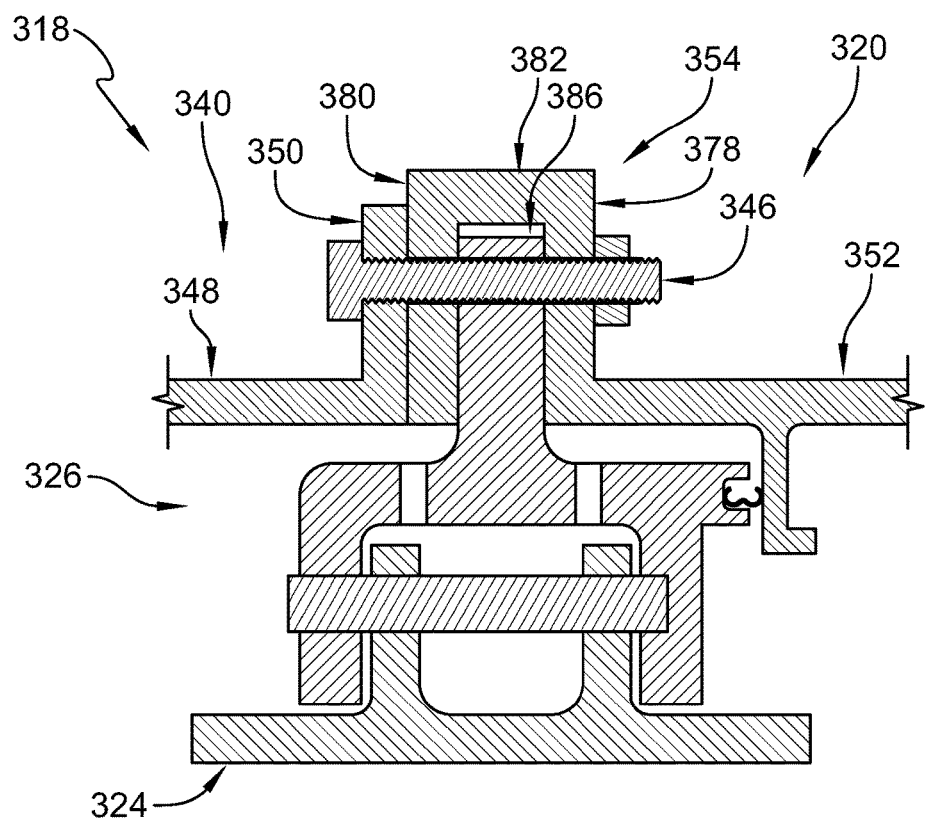
FIG. 7B is section view similar to FIG. 7A showing the aft outer casing includes an annular shell and a fore case flange that extends radially outward from the annular shell and around a mount flange of the carrier to couple the carrier to the outer case.

The turbine assembly 318 includes an outer case 320, a blade track segment 324, and a carrier 326 as shown in FIGS. 7A and 7B. The outer case 320 extends circumferentially at least partway around the axis 11. The blade track segments 324 define the gas path 29 of the turbine assembly 318 and block gases from passing over the blades 25 during use of the turbine assembly 318 in the gas turbine engine 10. The carrier 326 is coupled with the outer case 320 and the blade track segment 324 to support the blade track segment 324 in position radially relative to the axis 11.

The outer case 320 includes a fore outer casing 340, an aft outer casing 342, and a fastener 346 as shown in FIGS. 7A and 7B. The fore outer casing 340 is shaped to include a fore annular shell 348 that extends circumferentially about the axis 11 and a fore case flange 350 that extends radially outward from the fore annular shell 348. The aft outer casing 342 is shaped to include an aft annular shell 352 that extends circumferentially about the axis 11 and an aft case flange 354 that extends radially outward from the aft annular shell 352.

The fore case flange 350 includes a first radially extending portion 378, a second radially extending portion 380, and a connecting portion 382 as shown in FIG. 7A. The first radially extending portion 378 extends radially outward from the fore annular shell 348. The second radially extending portion 380 is axially spaced apart from the first radially extending portion 378. The connecting portion 382 extends between and interconnects the radially extending portions 378, 380 to define a channel 386.

The carrier 326 includes a support body 332 and a mount flange 234 as shown in FIG. 7A. The support body 332 is configured to support the blade track segment 324. The mount flange 334 of the carrier 326 extends radially outward from the support body 332 and is located in the channel 386 as shown in FIG. 7A.

In the illustrative embodiment, the mount flange 334 is arranged axially between the radially extending portions 378, 380 of the fore case flange 350 as shown in FIG. 7A. The second radially extending portion 380 of the fore case flange 350 engages the aft case flange 354 of the aft outer casing 342. The fastener 346 extends axially through the aft case flange 354, the fore case flange 350, and the mount flange 334 to couple the carrier 326 to the outer case 320 in the illustrative embodiment.

In the illustrative embodiment, rather than having a plurality of slots 36, 38 like the previous embodiments, the carrier 326 is segmented so as to relieve stresses caused by the radial movement of the carrier 326 in response to the thermal expansion and contraction of the outer case 320. However, the segmented carrier 326 increases the leakage paths between each carrier 326 to the air environment surrounding the outer case 320. As such, the fore case flange 350 is arranged to extend around the mount flange 334 of the carrier 326 and seal the gaps between each carrier segment 326, reducing leakage to the air environment surrounding the outer case 320. The fore case 350 is a full hoop arranged around the axis 11 with no axially extending gaps to seal.

In the illustrative embodiment, the fore case flange 350 is shaped to include the channel 386 as shown in FIG. 7A. In other embodiments, the aft case flange 354 may be shaped to include the channel 386 as shown in FIG. 7B.

In the illustrative embodiment of FIG. 7B, the aft case flange 354 may include the first radially extending portion 378, the second radially extending portion 380, and the connecting portion 382. The first radially extending portion 378 extends radially outward from the aft annular shell 352. The second radially extending portion 380 is axially spaced apart from the first radially extending portion 378. The connecting portion 382 extends between and interconnects the radially extending portions 378, 380 to define the channel 386.

In the illustrative embodiment of FIG. 7B, the second radially extending portion 380 of the aft case flange 354 engages the fore case flange 350 of the fore outer casing 340. The fastener 346 extends axially through the aft case flange 354, the fore case flange 350, and the mount flange 334 to couple the carrier 326 to the outer case 320 in the illustrative embodiment.

A method of assembling the turbine assembly 318 may include several steps. The method includes coupling the blade track segment 324 to the carrier 326 for movement therewith and coupling the mount flange 334 of the carrier 326 to the outer case 320 so that the carrier 326 is fixed with the outer case 320. To couple the mount flange 334 to the outer case 320, the method includes arranging the mount flange 334 in the channel 386 and arranging the fastener 346 through the fore case flange 350, the mount flange 334, and the aft case flange 354 to fix the carrier 326 to the outer case 320.

Depending on the size of the radial gap between the blade track segment 324 relative to the blades 25, the method may further include varying a flow of cooling air 21 into a cavity formed between the carrier 326 and the blade track segment 324. The flow of cooling air 21 may be pressurized to help seal the cavity between the components and prevent hot gases of the gas path 29 from entering the cavity.

Figure 8:
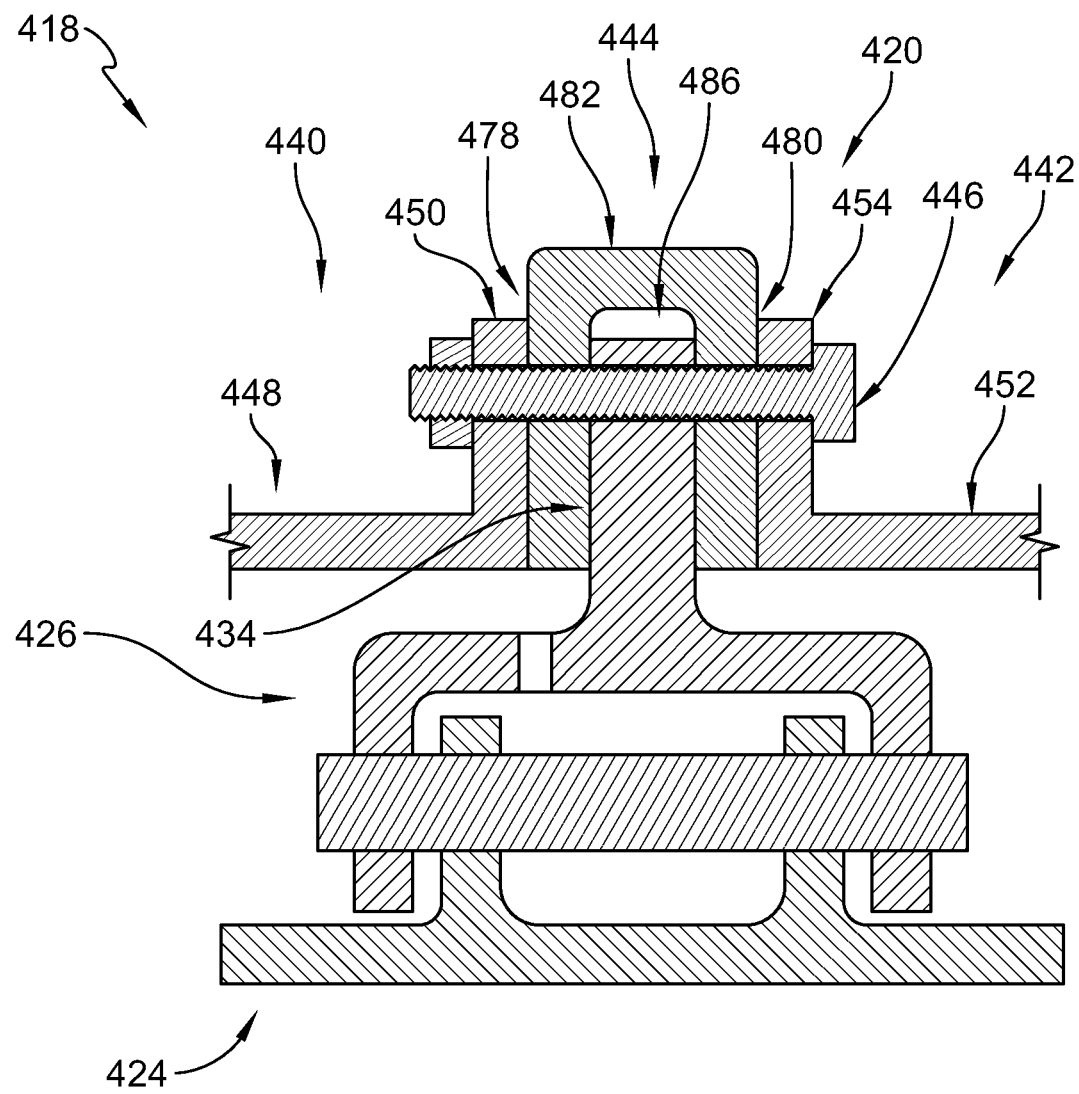
FIG. 8 is another embodiment of a turbine assembly for use in the gas turbine engine of FIG. 1 showing the turbine assembly includes an outer case having a fore outer casing, an aft outer casing, and a case insert, a blade track segment defining a portion of a gas path of the gas turbine engine, and a carrier coupled with the outer case and the blade track segment to support the blade track segment, and further showing the case insert is arranged between the fore and aft outer casings and is shaped to extend around a mount flange of the carrier.

Another embodiment of a turbine assembly 418 in accordance with the present disclosure is shown in FIG. 8. The turbine assembly 418 is substantially similar to the turbine assembly 18 shown in FIGS. 1-5 and described herein. Accordingly, similar reference numbers in the 400 series indicate features that are common between the turbine assembly 18 and the turbine assembly 418. The description of the turbine assembly 18 is incorporated by reference to apply to the turbine assembly 418, except in instances when it conflicts with the specific description and the drawings of the turbine assembly 418.

The turbine assembly 418 includes an outer case 420, a blade track segment 424, and a carrier 426 as shown in FIG. 8. The outer case 420 extends circumferentially at least partway around the axis 11. The blade track segments 424 define the gas path 29 of the turbine assembly 418 and block gases from passing over the blades 25 during use of the turbine assembly 418 in the gas turbine engine 10. The carrier 426 is coupled with the outer case 420 and the blade track segment 424 to support the blade track segment 424 in position radially relative to the axis 11.

The outer case 420 includes a fore outer casing 440, an aft outer casing 442, a case insert 444, and a fastener 446 as shown in FIG. 8. The fore outer casing 440 is shaped to include a fore annular shell 448 that extends circumferentially about the axis and a fore case flange 450 that extends radially outward from the fore annular shell 448. The aft outer casing 442 is shaped to include an aft annular shell 452 that extends circumferentially about the axis 11 and an aft case flange 454 that extends radially outward from the aft annular shell 452. The case insert 444 extends circumferentially at least partway about the axis 11 and is located axially between the fore case flange 450 and the aft case flange 454. The case insert 444 extends completely around the axis at least 360 degrees in the illustrative embodiment.

The case insert 444 includes a first radially extending portion 478, a second radially extending portion 480, and a connecting portion 482 as shown in FIG. 8. The second radially extending portion 480 is axially spaced apart from the first radially extending portion 478. The connecting portion 482 extends between and interconnects the radially extending portions 478, 480 to define a channel 486. In the illustrative embodiment, a mount flange 434 of the carrier 426 is located in the channel 486 as shown in FIG. 8.

In the illustrative embodiment, the case insert 444 extends around the mount flange 434 of the carrier 426 so that the carrier 426 is located in the channel 486 as shown in FIG. 8. The fore case flange 450 engages the first radially extending portion 278 and the aft case flange 454 engages the second radially extending portion 280 in the illustrative embodiment. The fastener extends axially through the fore case flange 450, the case insert 444, the aft case flange 454, and the mount flange 434 of the carrier 426 in the channel 386.

Similar to the previous embodiment of FIG. 7A, the carrier 426 is segmented, however, the segmented carrier 426 increases the leakage paths between each carrier 426 to the air environment surrounding the outer case 420. As such, the case insert 444 is included between the fore case flange 450 and the aft case flange 454 to seal the gaps between each carrier segment 426 and reduce leakage in the air environment surrounding the outer case 420.

A method of assembling the turbine assembly 418 may include several steps. The method includes coupling the blade track segment 424 to the carrier 426 for movement therewith and coupling the mount flange 434 of the carrier 426 to the outer case 420 so that the carrier 426 is fixed with the outer case 420.

To couple the mount flange 434 to the outer case 420, the method includes arranging the mount flange 434 the carrier segment 426 in the channel 486 of the case insert 444. After the mount flange 434 is assembled with the case insert 444, the assembled components are arranged between the fore outer casing 440 and the aft outer casing 442 so that the fore case flange 450 engages the first radially extending portion 478 and the aft case flange 454 engages the second radially extending portion 480. Then the method includes arranging the fastener 446 through the fore case flange 450, the case insert 444, the mount flange 434, and the aft case flange 454 to fix the carrier 426 to the outer case 420.

Figure 9:
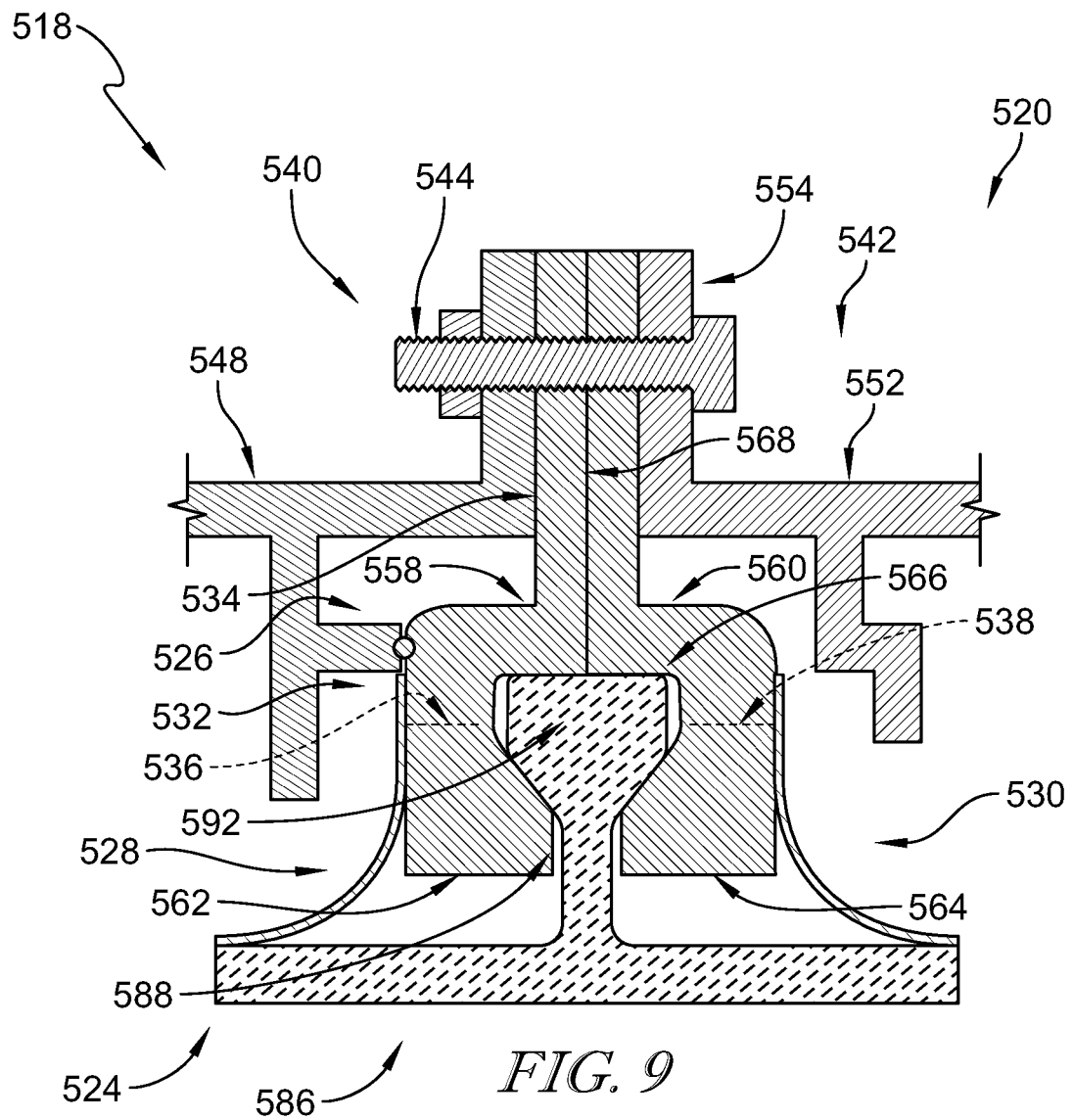
FIG. 9 is another embodiment of a turbine assembly for use in the gas turbine engine of FIG. 1 showing the turbine assembly includes an outer case, a blade track segment defining a portion of a gas path of the gas turbine engine, and a carrier shaped to include a fore carrier portion and an aft carrier portion that cooperate to define a radially inwardly opening channel that receives a portion of the blade track segment to couple the blade track segment to the carrier, and further showing the radially inwardly opening channel is dovetail shaped.

Another embodiment of a turbine assembly 518 in accordance with the present disclosure is shown in FIG. 9. The turbine assembly 518 is substantially similar to the turbine assembly 18 shown in FIGS. 1-5 and described herein. Accordingly, similar reference numbers in the 500 series indicate features that are common between the turbine assembly 18 and the turbine assembly 518. The description of the turbine assembly 18 is incorporated by reference to apply to the turbine assembly 518, except in instances when it conflicts with the specific description and the drawings of the turbine assembly 518.

The turbine assembly 518 includes an outer case 520, a blade track segment 524, and a carrier 526, and seals 528, 530 as shown in FIG. 9. The outer case 520 extends circumferentially at least partway around the axis 11. The blade track segments 524 define the gas path 29 of the turbine assembly 518 and block gases from passing over the blades 55 during use of the turbine assembly 518 in the gas turbine engine 10. The carrier 526 is coupled with the outer case 520 and the blade track segment 524 to support the blade track segment 524 in position radially relative to the axis 11. The seals 528, 530 are coupled to the carrier 526 on a forward side and an aft side of the carrier 526 to seal the carrier 526.

The outer case 520 includes a fore outer casing 540, an aft outer casing 542, and a fastener 544 as shown in FIG. 9. The fore outer casing 540 is shaped to include a fore annular shell 548 that extends circumferentially about the axis and a fore case flange 550 that extends radially outward from the fore annular shell 548. The aft outer casing 542 is shaped to include an aft annular shell 552 that extends circumferentially about the axis 11 and an aft case flange 554 that extends radially outward from the aft annular shell 552.

The blade track segment 524 includes a shroud wall 586 and a mount post 588 as shown in FIG. 9. The shroud wall 586 extends circumferentially partway about the axis 11. The mount post 588 extends radially outward away from the shroud wall 586. In the illustrative embodiment, the mount post 588 includes a dovetail head 592.

The carrier 526 includes a support body 532 and a mount flange 534 as shown in FIG. 9. The support body 532 is formed to define a radially inwardly opening channel 566 in which a mount post of the blade track segment 524 is located. The mount flange 534 extends radially outward from the support body 532. In the illustrative embodiment, the mount flange 534 is fastened with the outer case 520 for radial movement therewith in response to thermal expansion and contraction of the outer case 520 during use of the turbine assembly 518.

In the illustrative embodiment, the carrier 526 includes a fore carrier portion 558 defining a fore attachment flange 562 of the carrier 526 and an aft carrier portion 560 defining an aft attachment flange 564 of the carrier 526. The aft carrier portion 560 is engaged with the fore carrier portion 558 along an axial interface 568. The aft carrier portion 560 cooperates with the fore carrier portion 558 to define a radially inwardly opening channel 566 and the mount flange 534 of the carrier 526.

In the illustrative embodiment, the radially inwardly opening channel 566 is dovetail shaped as shown in FIG. 9. The dovetail head 592 of the mount post 588 is located in the radially inwardly opening channel 566.

The carrier 526 is also formed to define a plurality of slots 536, 538 as shown in FIG. 9. Each slot of the plurality of slots 536, 538 extends axially through portions of the support body 532 and radially outward only partway into the carrier 526. The arrangement of the slots 536, 538 relieves stresses caused by the radial movement of the carrier 526 in response to the thermal expansion and contraction of the outer case 520 during use of the turbine assembly.

The present disclosure relates to incorporating ceramic matrix composite materials in components of turbine shrouds or blade track segments 24 for use in gas turbine engines 10. A primary driver for the desire to utilize ceramic matrix composite materials for blade track segments 24 is the high operating temperature capability of the material. In order to maximize the high operating temperature capability of the ceramic matrix composite material, other components of the turbine assembly 18 may be configured so that the blade track segments 24 may operate as hot as possible.

Unfortunately, operating the blade track segments 24 at maximum operating temperature may set up a functional conflict between the significantly colder metallic materials of the outer case 20 and the ceramic matrix composite materials of the blade track segment 24. Since the ceramic matrix composite materials of the blade track segment 24 may have a low coefficient of thermal expansion (CTE) compared to the significantly higher CTE of the metallic materials of the outer case 20, the components may have significant thermal expansion and contraction relative to one another.

In some embodiments, an intermediate component sometimes referred to herein as a carrier 26, may be included to address such issues. The carrier 26 may be positioned radially between the ceramic matrix composite blade track segment 24 and the metallic outer case 20. The carrier 26 may be configured to hold on to both the blade track segment 24 and the outer case 20, while at the same time accommodating differences in operating temperatures and the accompanying thermal growth differences.

However, the inclusion of a carrier to accommodate differences in operating temperatures and thermal growth may also increases the total space claim radially outward of the blade track segment 24 used for the system. As a result, the outer case 20 may be pushed radially outward, driving up the weight and cost of the engine 10. At the same time, by limiting the radial space claim available to the blade track segment 24, the carrier may also thereby restrict potential ceramic matrix composite blade track segment 24 designs.

To reduce the radial space claim of the carrier 26, the present disclosure teaches integrating the carrier 26 with the case flanges 50, 54 of the outer case 20. In doing so, the carrier 26 and the outer case 20 share portions of the same radial claim, and allow design options which may provide reduced overall case diameter and/or increased space claim for the ceramic matrix composite blade track segment 24.

In the illustrative embodiment, the carrier 26 may be a single full hoop component as shown in FIG. 3, rather than individual segments. The full hoop carrier 26 may reduce the part count of the turbine assembly 18, reduce the potential leak paths, and/or provide a stiffer structure for attaching the ceramic matrix composite blade track segment 24, which may help carry other structural and pressure driven loads.

In the illustrative embodiment, the carrier 26 includes the mount flange 34 that is arranged between the combustor case i.e. the fore case flange 50 and the turbine case i.e. the aft case flange 54. In the illustrative embodiment, the pin 73 restricts radial movement of the blade track segment 24 relative to the carrier 26. In other embodiments, the blade track segment 224 is coupled to the carrier 226 with the pin 273 that extends completely through the assembled structure. In other embodiments, the blade track segment 224 may be coupled to the carrier 226 with a forward pin and an aft pin.

In the illustrative embodiment, the carrier 26, 226 is formed to include the plurality of slots 36, 38, 236 as suggested in FIGS. 5 and 6. These slots 36, 38, 236 may relieve thermal stress build up between the inner diameter of the carrier 26, 226 (i.e. the radially inwardly facing surface 59, 61 of the fore and aft attachment flanges 62, 64, 262, 264) and the outer diameter (i.e. the radially outwardly facing surface of the mount flange 34, 234). The slots 36, 38, 236 may stop short of the mount flange 34, 234 so that the attachment interface between the mount flange 34, 234 and the outer case 20, 220 maintains sealing between the inside of the outer case 20, 220 and the air environment radially outward of the outer case 20, 220.

Because the relief slots 36, 38 236 emanate from the hotter inner diameter of the carrier 26, 226, the hoop stress at the root or start of each of the slots 36, 38, 236 may be compressive in nature. The compressive hoop stress may help increase the life of the carrier 26, 226.

The slots 36, 38, 236 may also help improve blade tip gap control. The slots 36, 38, 236 in the carrier 26, 226 separate the radial position of the inner diameter of the carrier 26, 226 from being a direct consequence of the position of the outer diameter of the carrier 26, 226. Thus, the flow of cooling air 21 directed at the attachment interface between the carrier 26, 226 and the outer case 20, 220 to control the radial position of the blade track segment 24, 224 may more directly affect the radial positon of the blade track segment 24, 224.

However, in some embodiments, the slots 236 may allow axial migration of cooling air. To minimize the axial migration of cooling air, the turbine assembly 218 includes full hoop sheet metal seals 228, 230 as shown in FIG. 6.

In other embodiments, the slots may be formed in the outer diameter of the carrier 326, 426 (i.e. the slots extend radially inward into the mount flange 334, 434 of the carrier 326, 426. In the illustrative embodiment, the carrier 326, 426 is segmented, rather than a full hoop. As such, the sealing feature may be shifted radially outward to the outer case 320, 420.

As shown in FIG. 7A, the fore outer casing 340 is shaped to define the channel 386 that receives the mount flange 334 of the carrier 326. As the fore outer casing 340 and the aft outer casing 342 extend circumferentially about the axis 11, the fore case flange 350 seals between the segmented carriers 326.

In another embodiment, the outer case 420 includes the case insert 444 as shown in FIG. 8. The case insert 444 is a solid, full hoop that forms a radially inwardly opening channel 486. The case insert 444 may be very thin, so long as the case insert 444 is pinched between the adjacent case flanges 450, 454. The case insert 444 extends circumferentially about the axis 11 so as to seal the leaks or gaps between segmented carriers 426.

In another embodiment, the carrier 526 may utilize a two-piece configuration as shown in FIG. 9. The arrangement may result in a quadruple flange at the outer case and carrier attachment interface. In the illustrative embodiment, the blade track segment 524 is coupled to the carrier 526 with the dovetail head 592.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A turbine assembly for use with a gas turbine engine, the turbine assembly comprising
    an outer case comprising metallic materials and extending circumferentially at least partway around an axis,
    a blade track segment comprising ceramic matrix composite materials, the blade track segment configured to define a portion of a gas path of the turbine assembly, the blade track segment including a shroud wall that extends circumferentially partway about the axis and a mount post that extends radially outward away from the shroud wall,
    a carrier comprising metallic materials and coupled with the outer case and the blade track segment to support the blade track segment in a position radially relative to the axis, the carrier including a support body and a mount flange that extends radially outward from the support body, the mount flange being fastened with the outer case for radial movement with the outer case in response to thermal expansion and contraction of the outer case during use of the turbine assembly, and the support body formed to define a radially inwardly opening channel in which the mount post of the blade track segment is located,
    wherein the carrier is formed to define a plurality of slots that extend axially through portions of the support body and radially outward only partway into the carrier to relieve stresses caused by the radial movement of the carrier in response to the thermal expansion and contraction of the outer case during use of the turbine assembly,
    wherein the support body of the carrier includes a band that extends circumferentially about the axis, a fore attachment flange that extends radially inward from the band, and an aft attachment flange that extends radially inward from the band, the aft attachment flange is spaced apart axially from the fore attachment flange to define the radially inwardly opening channel between the fore attachment flange and the aft attachment flange, and wherein the carrier includes a fore carrier portion defining the fore attachment flange and an aft carrier portion defining the aft attachment flange and engaged with the fore carrier portion along an axial interface, and the aft carrier portion cooperates with the fore carrier portion to define the radially inwardly opening channel and the mount flange of the carrier.

2. The turbine assembly of claim 1, wherein the outer case includes a fore outer casing, an aft outer casing located axially aft of the fore outer casing, and a fastener, the fore outer casing including a fore annular shell and a fore case flange that extends radially outward from the fore annular shell, the aft outer casing including an aft annular shell and an aft case flange that extends radially outward from the aft annular shell, and wherein the mount flange is arranged axially between the fore case flange and the aft case flange and the fastener extends axially through the fore case flange, the mount flange of the carrier, and the aft case flange to couple the carrier to the outer case.

3. The turbine assembly of claim 2, wherein the mount flange includes a forward facing surface engaged by the fore case flange, an aft facing surface engaged by the aft case flange, and a radially outwardly facing surface that extends between the forward facing surface and the aft facing surface and is exposed to an air environment surrounding the outer case.

4. The turbine assembly of claim 2, wherein one of the fore case flange and the aft case flange is formed to define a channel, the mount flange of the carrier is located in the channel, and the fore case flange engages the aft case flange of the aft outer casing.

5. The turbine assembly of claim 2, wherein the outer case further includes a case insert that extends circumferentially at least partway about the axis and the case insert extends around the mount flange of the carrier and engages the fore case flange and the aft case flange.

6. The turbine assembly of claim 1, wherein the radially inwardly opening channel is dovetail shaped and the mount post includes a dovetail head located in the radially inwardly opening channel.

7. The turbine assembly of claim 1, wherein the plurality of slots include a plurality of fore slots formed in the fore attachment flange and a plurality of aft slots formed in the aft attachment flange that are circumferentially offset with the plurality of fore slots formed in the fore attachment flange.

8. A turbine assembly for use with a gas turbine engine, the turbine assembly comprising
an outer case arranged circumferentially at least partway around an axis,
a blade track segment, and
a carrier coupled with the outer case and the blade track segment to support the blade track segment in a position radially relative to the axis, the carrier including a support body that extends between a forward axial end and an aft axial end and a mount flange that extends radially outward from the support body, and the entire support body being located radially inward of the outer case,
wherein the mount flange is fixed with the outer case for movement with the outer case to control a radial position of the blade track segment relative to the axis in response to thermal expansion and contraction of the outer case,
wherein the outer case includes a fore outer casing and an aft outer casing located axially aft of the fore outer casing, the fore outer casing including a fore annular shell and a fore case flange that extends radially outward from the fore annular shell, the aft outer casing including an aft annular shell and an aft case flange that extends radially outward from the aft annular shell, and wherein the mount flange is arranged axially between the fore case flange and the aft case flange, and
wherein the outer case further includes a case insert that extends circumferentially at least partway about the axis and the case insert extends around the mount flange of the carrier and engages the fore case flange and the aft case flange.

9. The turbine assembly of claim 8, wherein the carrier is formed to define a plurality of slots that extend radially outwardly partway into the carrier.

10. The turbine assembly of claim 9, wherein the plurality of slots extend radially outward into radially inward facing surfaces of the carrier.

11. The turbine assembly of claim 10, wherein the support body includes a band that extends circumferentially about the axis, a fore attachment flange that extends radially inward from the band, and an aft attachment flange that extends radially inward from the band, the plurality of slots include a plurality of fore slots formed in the fore attachment flange and a plurality of aft slots formed in the aft attachment flange that are circumferentially offset with the plurality of fore slots formed in the fore attachment flange.

12. The turbine assembly of claim 11, wherein the carrier includes a fore carrier member and an aft carrier member that mates with and cooperates with the fore carrier member to define a radially inwardly opening channel.

13. The turbine assembly of claim 8, wherein the carrier includes a plurality of carrier segments that each extend circumferentially partway about the axis and the fore case flange extends around a radially outwardly facing surface of the mount flange of the carrier and engages the aft case flange of the aft outer casing.

14. A turbine assembly for use with a gas turbine engine, the turbine assembly comprising
an outer case comprising metallic materials and extending circumferentially at least partway around an axis,
a blade track segment comprising ceramic matrix composite materials, the blade track segment configured to define a portion of a gas path of the turbine assembly, the blade track segment including a shroud wall that extends circumferentially partway about the axis, a fore mount post that extends radially outward away from the shroud wall, and an aft mount post that extends radially outward away from the shroud wall, that is spaced apart axially from the fore mount post, and that is entirely parallel with the fore mount post along a radial extent of the fore mount post and the aft mount post,
a carrier comprising metallic materials and coupled with the outer case and the blade track segment to support the blade track segment in position radially relative to the axis, the carrier including a support body and a mount flange that extends radially outward from the support body, the mount flange being fastened with the outer case for radial movement with the outer case in response to thermal expansion and contraction of the outer case during use of the turbine assembly, and the support body formed to define a radially inwardly opening channel,
wherein the carrier is formed to define a plurality of slots that extend axially through portions of the support body and radially outward only partway into the carrier to relieve stresses caused by the radial movement of the carrier in response to the thermal expansion and contraction of the outer case during use of the turbine assembly, wherein the support body of the carrier includes a band that extends circumferentially about the axis, at least one fore attachment flange that extends radially inward from the band, and at least one aft attachment flange that extends radially inward from the band, the at least one aft attachment flange is spaced apart axially from the at least one fore attachment flange to define the radially inwardly opening channel between the fore attachment flange and the aft attachment flange, and wherein the fore mount post and the aft mount post of the blade track segment are located within the radially inwardly opening channel of the carrier.

15. The turbine assembly of claim 14, wherein the outer case includes a fore outer casing, an aft outer casing located axially aft of the fore outer casing, and a fastener, the forward outer casing including a fore annular shell and a fore case flange that extends radially outward from the fore annular shell, the aft outer casing including an aft annular shell and an aft case flange that extends radially outward from the aft annular shell, and wherein the mount flange is arranged axially between the fore case flange and the aft case flange and the fastener extends axially through the forward case flange, the mount flange of the carrier, and the aft case flange to couple the carrier to the outer case, and wherein one of the fore case flange and the aft case flange is formed to define a channel, the mount flange of the carrier is located in the channel, and the fore case flange engages the aft case flange of the aft outer casing.

* * * * *